United States Patent
Okada et al.

(10) Patent No.: US 6,333,765 B1
(45) Date of Patent: Dec. 25, 2001

(54) TELEVISION RECEIVER HAVING AN AGC CIRCUIT TO CONTROL THE GAIN ON A TUNER

(75) Inventors: Hirofumi Okada; Munetoshi Kajiya, both of Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/367,854

(22) PCT Filed: Mar. 2, 1998

(86) PCT No.: PCT/JP98/00871

§ 371 Date: Aug. 30, 1999

§ 102(e) Date: Aug. 30, 1999

(87) PCT Pub. No.: WO98/39916

PCT Pub. Date: Sep. 11, 1998

(30) Foreign Application Priority Data

Mar. 5, 1997 (JP) .................................................. 9-050390

(51) Int. Cl.[7] ................................. H04N 5/52; H04N 5/44
(52) U.S. Cl. ........................... 348/678; 348/735; 348/733
(58) Field of Search ..................................... 348/678, 725, 348/731, 733, 735; H04N 5/52, 5/44

(56) References Cited

U.S. PATENT DOCUMENTS 5,638,140 * 6/1997 Krishnamurthy .................. 348/735
5,638,141 * 6/1997 Bae ....................................... 348/735

FOREIGN PATENT DOCUMENTS 58-83481    5/1983   (JP) .
5-304430   11/1993   (JP) .
6-178228    6/1994   (JP) .

* cited by examiner

*Primary Examiner*—Sherrie Hsia
(74) *Attorney, Agent, or Firm*—Arent Fox Kintner Plotkin & Kahn, PLLC

(57) ABSTRACT

A television receiver includes an input terminal (12). Through the input terminal is inputted an input signal having a predetermined electric field intensity. That is, a tuner (14) converts the input signal into a video intermediate frequency signal and audio intermediate frequency signal. The video intermediate frequency signal is amplified by a video intermediate frequency amplifier circuit (16). Based on that frequency, a filter (26) outputs a detection signal (Va). An RF-AGC circuit (32) outputs a reference voltage (Vref). An RF-AGC circuit (30) creates a control voltage (Vb) in response to a difference between the detection signal and the reference voltage. The tuner is controlled in gain by this control voltage. The reference voltage is varied by a microcomputer (36) depending upon the control voltage. Accordingly, the control voltage is adjusted to a desired voltage value.

5 Claims, 5 Drawing Sheets

US 6,333,765 B1

TELEVISION RECEIVER HAVING AN AGC CIRCUIT TO CONTROL THE GAIN ON A TUNER

TECHNICAL FIELD

This invention relates to television receivers and, more particularly, to a television receiver having, for example, an AGC (Automatic Gain Control) circuit to control the gain on a tuner and intermediate frequency amplifier circuit.

PRIOR ART

In a prior art of this kind shown in FIG. 5, a television receiver 1 has an AGC amplifier circuit 2 and RF (Radio Frequency)-AGC circuit 3 to control the gain on a tuner and video intermediate frequency amplifier circuit 6 in response to an electric field intensity given by an input signal (radio frequency signal) supplied through an input terminal 4.

For example, in a process of adjusting the RF-AGC circuit 3 before shipment from a factory, monitored on an output terminal 8 is an output voltage of the RF-AGC circuit 3 with respect to an input signal having an electric field intensity A, as shown in FIG. 4. Variable resistance Rx is adjusted such that the output voltage becomes B.

In the conventional television receiver 1, however, there is difference on an individual television receiver basis in characteristics such as of a video intermediate frequency amplifier circuit 6, video wave detection circuit 7 and not-shown SAW filter (comb filter). Thus, there has been a necessity to manually adjust the variable resistance $R_x$ one by one before shipment from the factory. This, however, results in a problem that adjustment requires increased labor and time and, if adjusted, an adjustment error is encountered due to adjuster's subjective point of view.

SUMMARY OF THE INVENTION

It is therefore a primary object of the present invention to provide a television receiver which can be easily and accurately adjusted in gain on the tuner.

A television receiver according to the present invention, comprises: a tuner for receiving an input signal having a predetermined electric field intensity; a waveform detection means for detecting an output waveform of the tuner and outputting a video signal; a creating means for creating gain control voltage on the tuner in response to a difference in level between the video signal and a reference voltage; and a change means for changing the reference voltage such that the gain control voltage becomes a desired voltage value.

If for example an input signal having a predetermined electric field intensity is supplied to the tuner, the tuner creates a video intermediate frequency signal and audio intermediate frequency signal based on the input signal. The detecting means detects an output of the tuner and outputs a composite video signal. The composite video signal is supplied as an output of the detection means to the creating means. Meanwhile, the creating means is given a reference voltage. The creating means creates a gain control voltage on the tuner depending upon a difference between the output of the detection means and the reference voltage. The change means detects a gain control voltage by the detection means and change the reference voltage depending upon a result of the detection. This brings the gain control voltage to a desired voltage value.

According to the present invention, the creating means creates a gain control voltage on the tuner depending upon a difference between the output of the detection means and the reference voltage as an output of the change means, thereby saving time and labor in adjustment and hence eliminating adjustment error.

The above described objects and other objects, features, aspects and advantages of the present invention will become more apparent from the following detailed description of the present invention when taken in conjunction with the accompanying drawings.

BEST FORM FOR PRACTICING THE INVENTION

Figure 1:
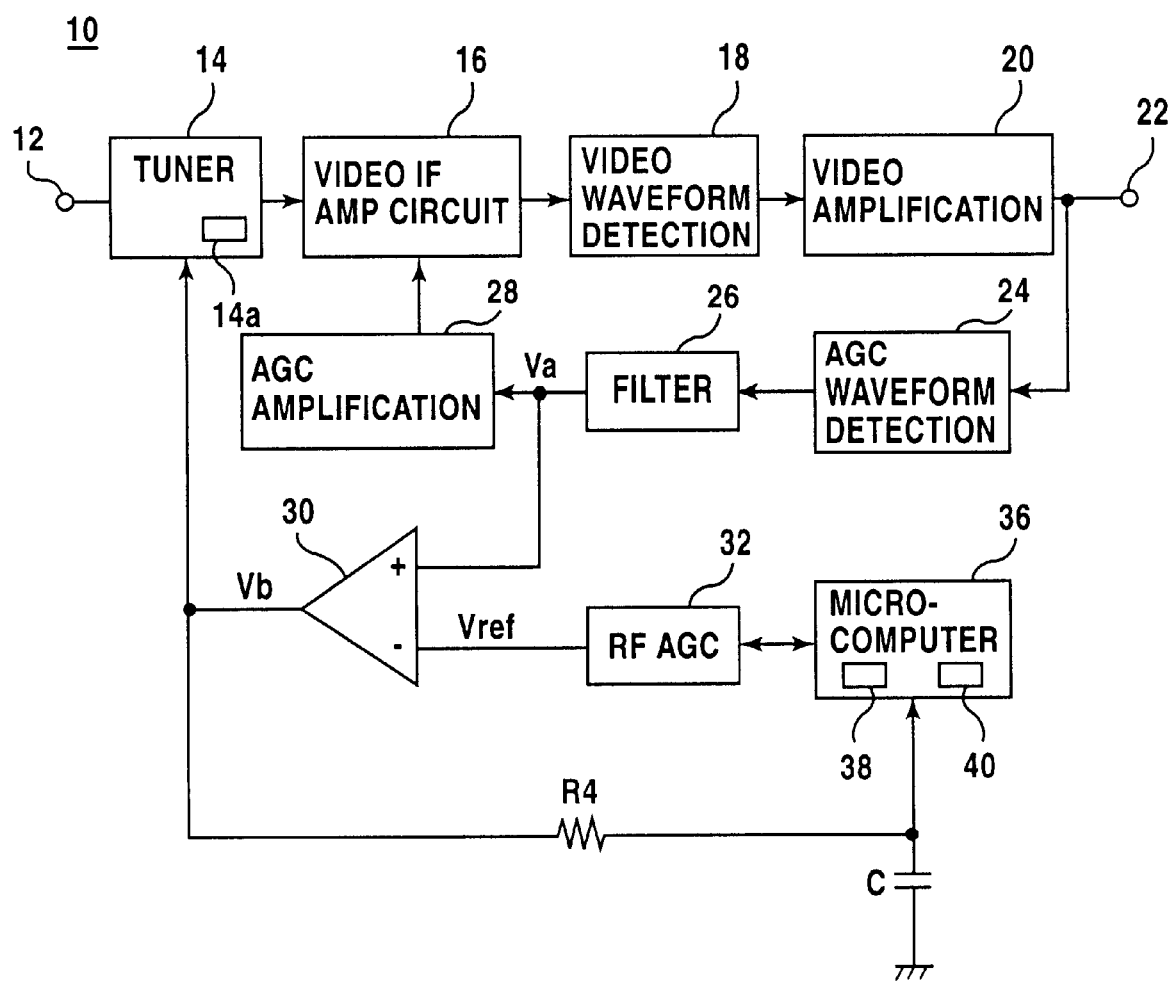
FIG. 1 is a block diagram showing one embodiment of the present invention.
Figure 4:
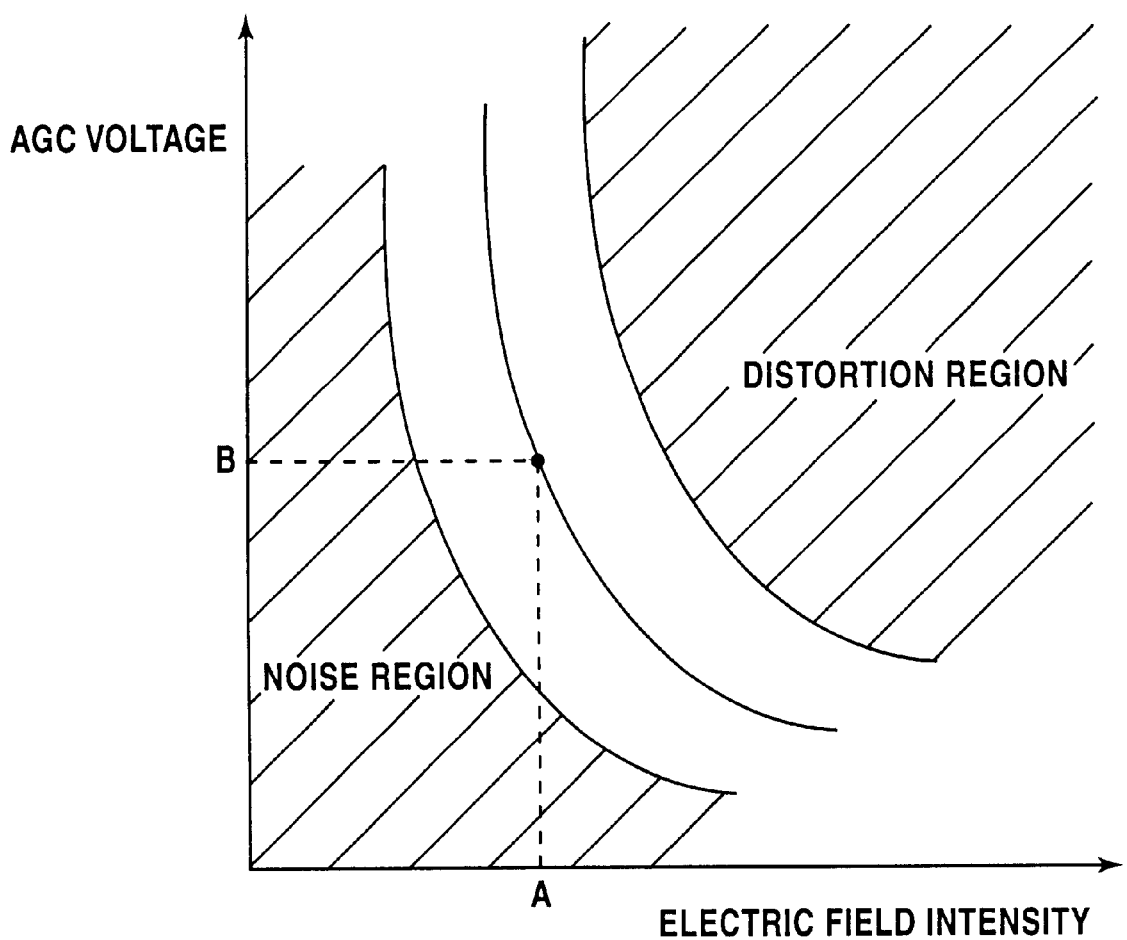
FIG. 4 is a graph representative of an AGC output voltage with respect to an intensity of the electric field.
Figure 5:
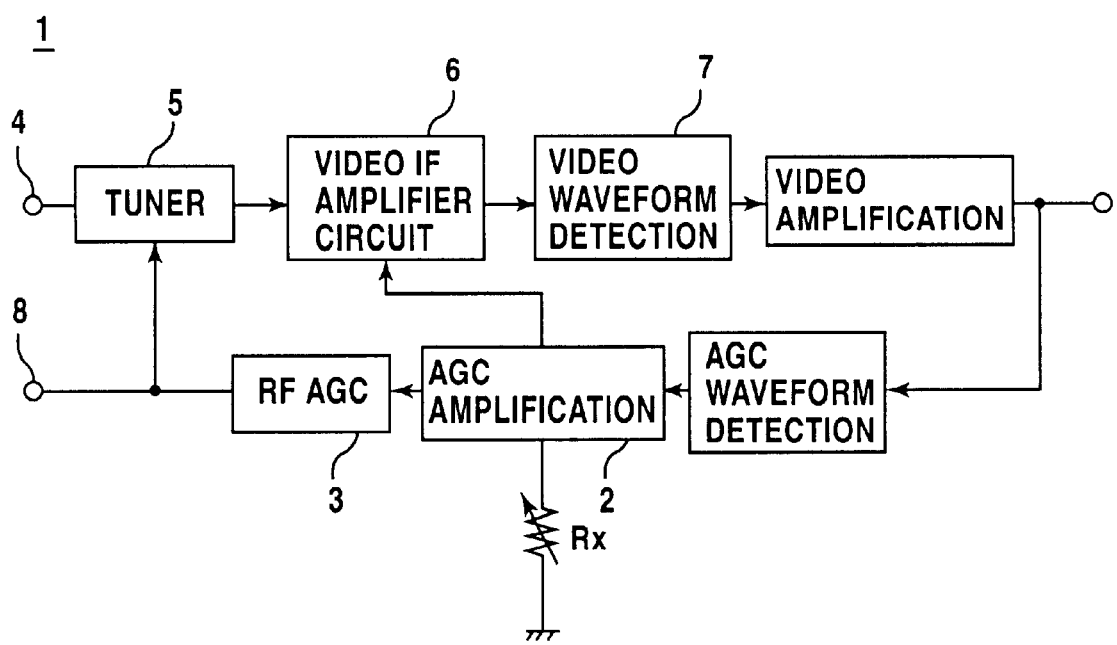
FIG. 5 is a block diagram of the conventional television receiver.

Referring to FIG. 1, a television receiver 10 of this embodiment includes an input terminal 12. This input terminal 12 is given an input signal having, for example, an electric field intensity A as shown in FIG. 4. The input signal as a radio frequency signal is converted into an audio intermediate frequency signal and video intermediate frequency signal by a tuner 14. The audio intermediate frequency signal is processed of FM (Frequency Modulation) detection, demodulation and amplification by a not-shown audio processing section whereby a desired level of sound is outputted through a speaker (not shown). Meanwhile, the video intermediate frequency signal is amplified by a video intermediate frequency amplifier circuit 16 and delivered to a video detection circuit 18. The video detection circuit 18 detects an amplified video intermediate frequency signal to create a composite video signal. The composite video signal is amplified by a video amplifier circuit 20 and outputted to a video signal processing circuit (not shown) through an output terminal 22.

The composite video signal through the video amplifier circuit 20 is also detected in an AGC detection circuit 24. The detection signal contains a high range component which is removed by a filter 26. An AGC amplifier circuit 28 receives an output of the filter 26 and controls a gain on the video intermediate frequency amplifier circuit 16. Consequently, the video intermediate frequency amplifier circuit 16 is feedback-controlled by the AGC detection circuit 24, filter 26 and AGC amplifier circuit.

The output of the filter 26 is also inputted as a detection signal Va to a plus input terminal of an RF-AGC amplifier circuit (operational amplifier) 30. On the other hand, the minus input terminal of the RF-AGC amplifier circuit 30 is given a difference voltage Vref outputted from an RF-AGC circuit 32. The RF-AGC amplifier circuit 30 creates a gain control voltage Vb to control the gain on the tuner 14 in response to a difference between the detection signal Va and the difference voltage Vref, The created gain control voltage Vb is supplied to a radio frequency amplifier circuit 14a provided in the tuner 14.

Figure 2:
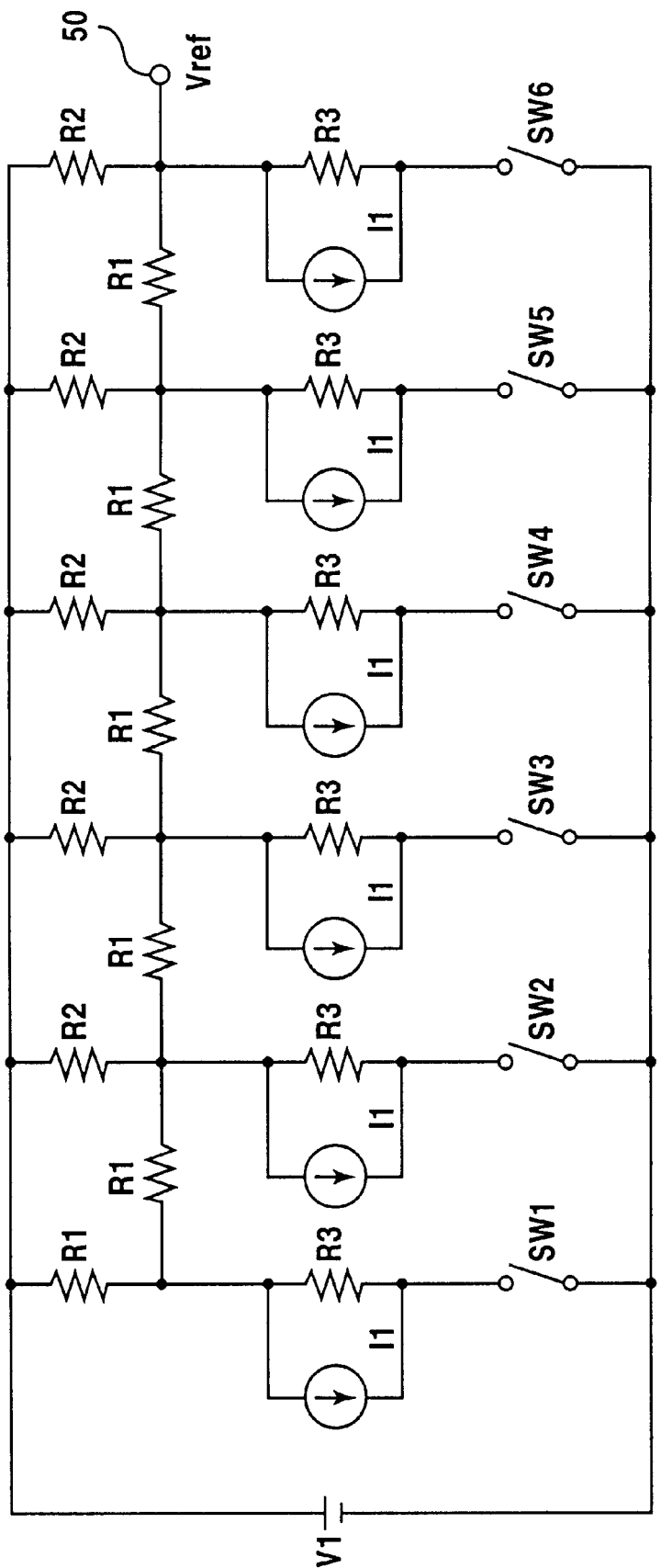
FIG. 2 is a diagram showing an RF-AGC circuit of the FIG. 1 embodiment.

The RF-AGC circuit 32 is structured, as shown in FIG. 2, by a constant voltage source V1, a plurality of resistors R1, a plurality of resistors R2, a plurality of resistors R3 switches SW1–SW6 and a constant current source I1. That is, the constant voltage source V1 on a plus side is connected with one ends of the resistor R1 and five resistors R2. The register R1 has the other end connected to one end of the switch SW1 through parallel-connected constant current sources I1 and resistors R3. The five resistors R2 has the other ends connected to one ends of the switches SW2–SW6 through similarly parallel-connected constant current sources I1 and resistors R3. The switches SW1–SW6 has the other ends connected to a minus side of the constant voltage source V1, constituting a parallel circuit. Also, the other ends of the resistor R1 and the five resistors R2 are connected together through resistors R1. Furthermore, an output terminal 50 is connected to a connection point between the resistor R2 and the resistor R3 connected in series to the switch SW6.

The switches SW1–SW6 are switched according to an instruction by a microcomputer 36. That is, the micro-computer 36 has a 6-bit register in which stored is control data to control on/off of the switches SW1–SW6. The micro-computer 36 turns on the switches SW1–SW6 when each bit of control data is "0", and turns off the switches SW1–SW6 when each bit is "1". Accordingly, when the register 38 has a data value, for example, of "110010", the micro-computer 36 turns off the switches SW2, SW5 and SW6, and turns on the switches SW1, SW3 and SW4. By thus controlling the switches SW1–SW6, the internal resistance value of the RF-AGC circuit 32 is varied to thereby vary the reference voltage Vref to be outputted through the output terminal 50.

A resistor R4 and capacitor C are inserted between an output of the RF-AGC amplifier circuit 30 and a ground so that the gain control voltage Vb is reduced in voltage by the resistor R4 and smoothed by the capacitor C. The smoothed voltage is detected by the micro-computer 36. Meanwhile, micro-computer 36 includes a non-volatile memory 40. When the control voltage Vb for an input signal having an electric field intensity A is adjusted to a desired voltage value B by operating the switches SW1–SW6 as shown in FIG. 4, a data value in the register 38 is written to the non-volatile memory 40.

FIG. 4 illustrates a characteristic of an AGC voltage against an electric field intensity (gain control voltage Vb). That is, if an AGC voltage is excessively low in spite of a low electric field intensity, the tuner 14 will be worsened in output S/N ratio. Meanwhile, if the AGC voltage is excessively high despite the electric field intensity is high, cross-modulation distortion will occur in the tuner 14 output. Accordingly, in this embodiment the micro-computer 36 controls the RF-AGC circuit 32 such that the AGC voltage for an electric field intensity A exists within an effective region defined between a noise region and a distortion region and that the gain control voltage Vb for the electric field intensity A becomes a voltage value B. Incidentally, for an electric field intensity A if a smoothed voltage to be detected by the micro-computer 36 lies between 4.02V and 4.34V, the gain control voltage Vb should be adjusted to an approximate value B.

Figure 3:
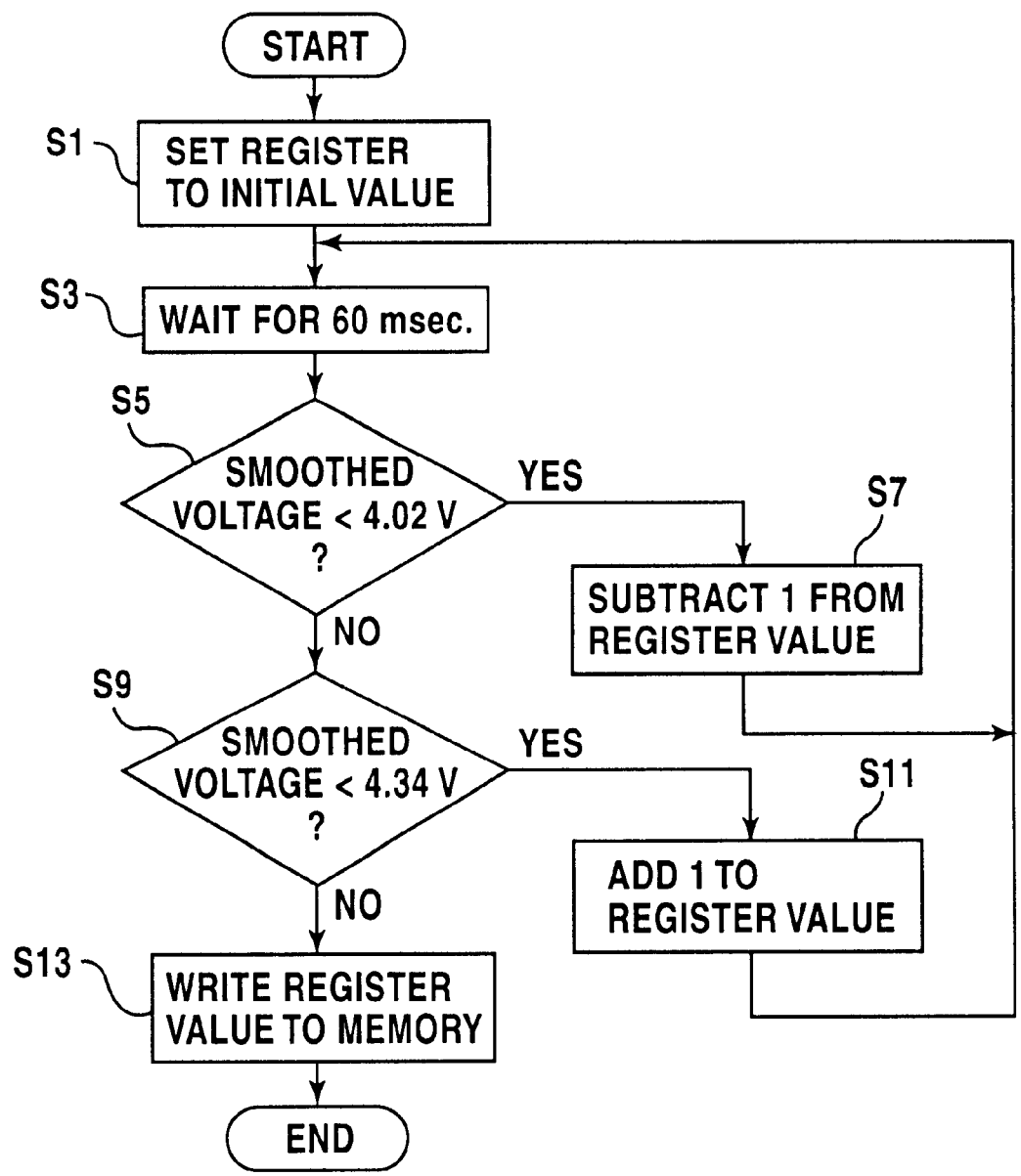
FIG. 3 is a flowchart showing a part of operation in the FIG. 1 embodiment.

If the power for the television receiver 10 is turned on while providing a radio frequency signal with an electric field intensity A onto the input terminal 12, the micro-computer 36 starts to process a flowchart shown in FIG. 3. First, in step S1 the register 38 is set to an initial value "110010". This initial value is a value that have been set on an assumption that the gain control voltage Vb becomes B when the electric filed intensity is at A. Then, in step S3 the process is waited for 60 milliseconds taking into consideration a time constant for the CR circuit formed by the resistor R and capacitor C. Thereafter, it is determined in step S5 whether the smoothed voltage due to the capacitor C is lower than 4.02V or not. If "YES", in step S7 the register value is decremented, returning to the step S3. On the other hand, If "NO" in the step S5, it is determined in step S9 whether the smoothed voltage is higher than 4.34V or not. If "YES", in step S11 the register value is incremented, returning to the step S3. However, if "NO", it is considered that the gain control voltage Vb is B in voltage value, and in step S13 the register value at that time is written to the non-volatile memory 40, thus ending the process.

According to this embodiment, the micro-computer 36 controls the RF-AGC circuit 32 such that the gain control voltage Vb becomes B with respect to an input signal having an electric field intensity A. This eliminates adjustment error due to adjuster's subjective point of view and hence saves time and labor during adjustment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television receiver, comprising:

a tuner for receiving an input signal having a predetermined electric field intensity;

a waveform detection means for detecting an output waveform of said tuner and outputting a video signal;

a creating means for creating gain control voltage on said tuner in response to a difference in level between the video signal and a reference voltage; and a change means for changing the reference voltage such that the gain control voltage becomes a desired voltage value.

2. A television receiver according to claim 1, wherein said change means includes a generating means to generate the reference voltage, a detection means to detect the gain control voltage, and control means to control said generating means responsive to the gain control voltage.

3. A television receiver according to claim 2, wherein said generating means includes a plurality of switches and a resistance network to generate a voltage of a value dependent upon on/off states of said switches.

4. A television receiver according to claim 3, wherein said control means includes a register to provide respective on/off signals to the switches and a register value change means to change a register value of said register depending upon the gain control voltage detected by said detection means.

5. A television receiver according to claim 4, wherein said register value change means includes a decrement means to decrement the register value when the gain control voltage is lower than a first voltage and an increment means to increment the register value when the gain control voltage is higher than a second voltage.

* * * * *